June 27, 1950 P. H. DIXON ET AL 2,512,738
DRIVE MECHANISM
Filed Jan. 30, 1946 2 Sheets-Sheet 1

Inventors
Paul H. Dixon
Daniel Walker Hannable
By their Attorney

June 27, 1950 P. H. DIXON ET AL 2,512,738
DRIVE MECHANISM
Filed Jan. 30, 1946 2 Sheets-Sheet 2

Inventors
Paul H. Dixon
Daniel Walker Hannable
By their Attorney

Patented June 27, 1950

2,512,738

UNITED STATES PATENT OFFICE 2,512,738

DRIVE MECHANISM

Paul H. Dixon, Wenham, and Daniel Walker Hannable, Beverly, Mass., assignors to United Shoe Machinery Corporation, Flemington, N. J., a corporation of New Jersey Application January 30, 1946, Serial No. 644,348

10 Claims. (Cl. 192—149)

This invention relates to drive mechanisms for starting and stopping the shaft of a machine, and particularly to a novel drive mechanism which is capable of effectively cushioning inertia and momentum shocks.

It is an object of this invention to provide a drive mechanism of the above-mentioned type that is dependable in operation, readily adaptable to varying operating conditions, and of relatively compact and simple construction. To this end, in the herein illustrated embodiment of the invention there is supported on the shaft to be driven a hollow shaft on which the driven member such, for example, as a belt pulley, is rotatably mounted. For starting and stopping the driven shaft, the hollow shaft, which is yieldingly connected to the driven shaft, is provided with abutment faces adapted to cooperate with stop fingers and also carries a clutch member arranged to be moved into engagement with a cooperating recess formed in the driving member, or pulley. Means are also provided for selectively moving the stop fingers out of engagement with the abutment faces to free the hollow shaft for rotation and simultaneously effecting engagement of the clutch member with the recess to connect the drive member to the hollow shaft or withdrawing said clutch member from the recess to disconnect the driven member from the the hollow shaft and simultaneously moving the stop fingers into engagement with the abutment face to hold the hollow shaft against rotation in either direction.

For the purpose of cushioning inertia and momentum shocks attendant upon the starting and stopping of the driven shaft, the hollow shaft is connected thereto through fluid dashpots, preferably adapted to give a yielding drive which readily may be varied to accommodate different operating conditions, and the arrangement is such that a positive drive connection is obtained after a predetermined cushioning action has been effected.

The above and other objects and features of the invention will be apparent from the following detailed description of the preferred embodiment thereof, illustrated in the accompanying drawings, and will be pointed out in the claims.

In the drawings:

Fig. 4 is a view in section, taken on line IV—IV of Fig. 1 and looking in the direction of the arrows;

Fig. 5 is a view in section, taken on line V—V of Fig. 1 and looking in the direction of the arrows;

Fig. 6 is a plan view of one of the operating elements of the drive mechanism.

Figure 1:
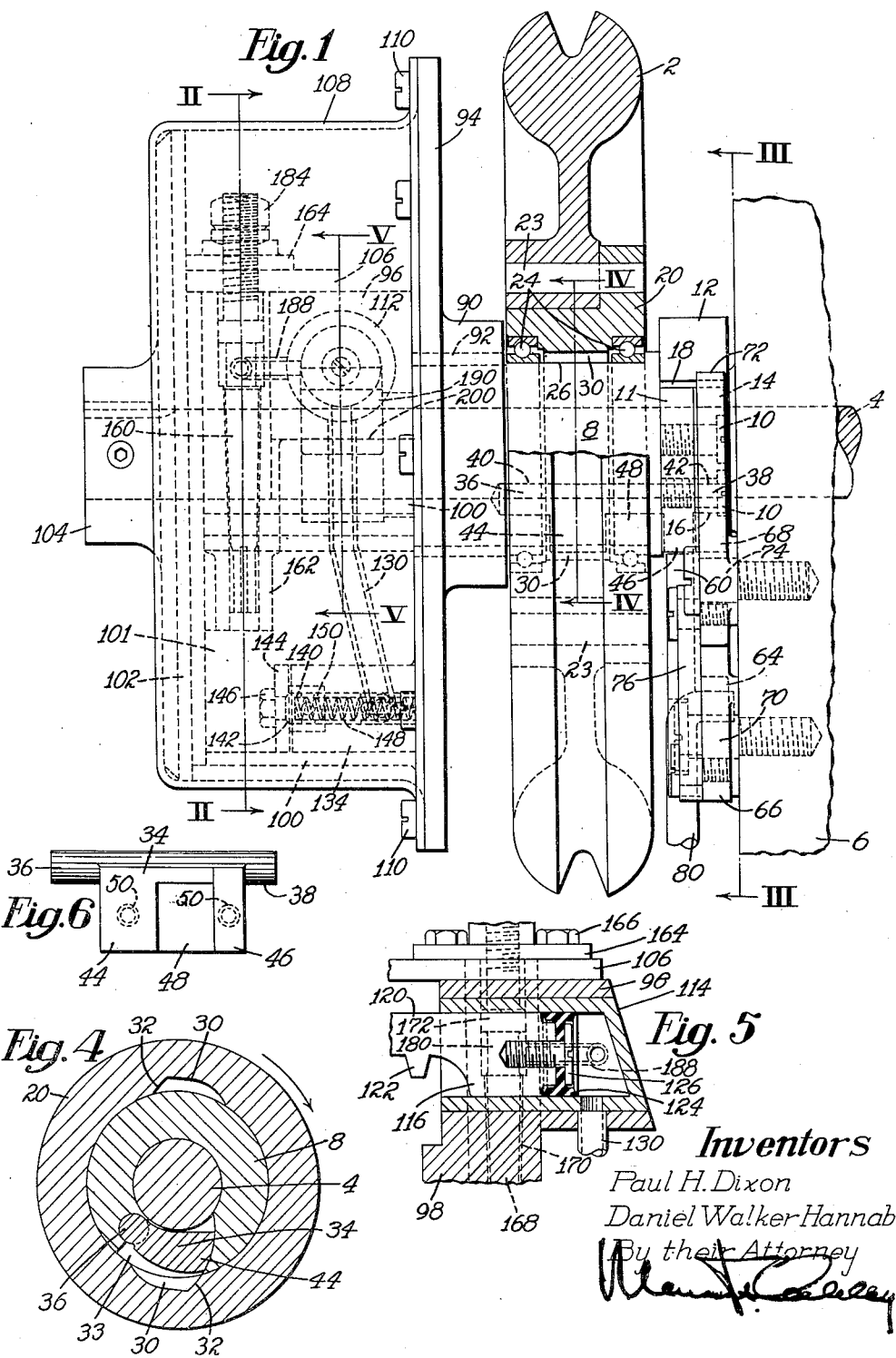
Fig. 1 is a view in side elevation, with certain parts in section, of a drive mechanism embodying the features of this invention.
Figure 3:
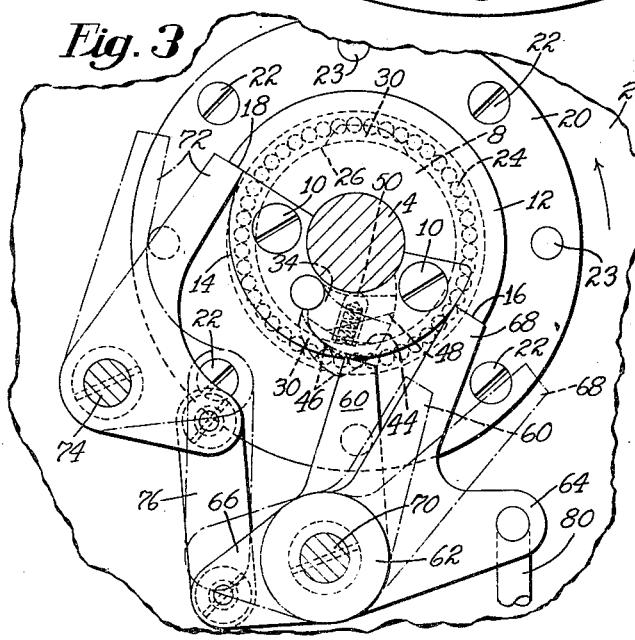
Fig. 3 is a view in section, taken on line III—III of Fig. 1 and looking in the direction of the arrows, showing other component parts of the mechanism.

Referring to the drawings and particularly Figs. 1 and 3 thereof, the drive mechanism is therein illustrated as arranged to transmit power from a belt pulley 2 to an input shaft 4 that is shown extending into a casing 6 of a machine to be driven and in which it is rotatably mounted on suitable bearings not shown. Surrounding the shaft 4, and rotatably mounted thereon, is a hollow shaft 8, which, adjacent to the casing 6, is provided with two substantially semi-circular flanges 12 and 14, one of these flanges being formed integrally with the shaft 8 and being larger than the other, which is secured to the shaft by screws 10, to provide abutment surfaces 16 and 18. Adjacent to the flange 14 the shaft 8 is reduced in size to a diameter the same as that of this flange for a short distance, as shown at 11, Fig. 1. The pulley 2 has a hub 20, secured thereto by means of screws 22 and dowel pins 23, and this hub is rotatably mounted by means of anti-friction bearings 24 on a cylindrical portion 26 of the hollow shaft 8.

For driving the hollow shaft 8 from the pulley 2, the hub 20 of the pulley is provided with diametrically opposed recesses 30 having end abutment faces 32 adapted, at times, to be engaged by a clutch member 34 that is located in a slot 33 in the hollow shaft. The member 34 is formed integrally with trunnion shafts 36, 38 that are rotatably mounted in bearing bores 40, 42, one in the hollow shaft 8 and the other in flange 14, and has an operating lug 44 and a controlling lug 46, see Figs. 3, 4 and 6, these lugs being separated by a cut-away portion 48 adapted to provide clearance for the inner race of one of the bearings 24. In each of these lugs there is a spring-pressed plunger 50 which bears against the shaft 4 and, therefore, tends to rotate the member 34 in a clockwise direction as viewed in Fig. 3, thus to swing the operating lug 44 outwardly into one or the other of the recesses 30 and connect the pulley 2 to the hollow shaft 8. Such movement of the member 34 is normally prevented by a finger 60 that bears against the control lug 46, see Fig. 3. The finger 60 is formed integrally with a hub 62 of a lever having arms 64 and 66 and a stop finger 68, the latter being arranged, when the parts are in the full-line positions shown in Fig. 3, to engage the abutment face 16 of the flange 12. The hub 62 is journaled on a stud 70 mounted on the casing 6. A second stop finger 72 is arranged to engage the abutment face 18 on the flange 12 and this finger is pivoted on a stud 74, mounted in the casing 6, and operatively connected to the arm 66 by means of a link 76.

The arrangement is such that when the arm 64 is moved downwardly, as by means of a treadle-operated rod 80, the finger 60 will be moved to the broken-line position, Fig. 3, thus permitting the lug 44 to move outwardly into one or the other of the recesses 30 and into engagement with its abutment face 32, thus connecting the pulley 2 to the shaft 8. At the same time the shaft 8 will be released for rotation by movement of the stop fingers 68 and 72 out of engagement with the abutment faces 16 and 18 on the flange 12, see broken-line position Fig. 3. When the treadle is released, thus permitting the rod 80 to be elevated, by a spring, not shown, the parts will return to the positions shown in full and dotted lines in Fig. 3, the finger 60 first engaging the lug 46 and moving the lug 44 inwardly and out of the recesses 30, thereby disconnecting the shaft 8 from the pulley 2, and finally, when the flange 12 comes to the proper position, fingers 68 and 72 will be moved inwardly and into engagement with the abutment faces 16 and 18. When the parts are in this position shaft 8 is positively held against rotation in either direction. To compensate for the different rates of movement of the stop fingers 68 and 72, resulting from the linkage arrangement illustrated, the abutment face 16 is made wider than face 18, the flange 14 being slightly eccentric. The parts are so proportioned and arranged that, as the treadle is depressed, stop fingers 68 and 72 leave their cooperating abutment faces at the same instant and just before finger 60 moves away from lug 46. When the treadle is released finger 60 will engage lug 46, thus disengaging lug 44 from a recess 30, before the fingers 68 and 72 come in beneath their cooperating faces 16 and 18 to arrest movement of the hollow shaft 8.

For cushioning the shock attendant upon starting and stopping shaft 4 a yielding connection is provided between this shaft and hollow shaft 8. A hub 90, carrying a bushing 92, is rotatably supported on the shaft 8 adjacent to the pulley 2 and formed integrally with this hub is a circular flange 94 from which extend a pair of cylinder heads 96, 98 and an axially directed, substantially semicircular flange 100. Secured, as by welding, to the open end of the flange 100 is a second circular flange 102 having a central hub portion 104, to which the shaft 4 is keyed, and this circular flange 102 is also secured to the top portions of the cylinder heads by means of a cross-member 106, welded to the cylinder heads 96 and 98 and to the flange 102. A sheet metal cover member 108 fits over the hub 104 and flange 102 and is secured to the flange 94 by screws 110.

Cylinders 112 and 114 are carried by the heads 96 and 98, respectively, and slidably mounted in these cylinders are pistons 116 and 118 formed integrally on a plunger 120 which has rack teeth 122 cut along its mid-portion. Each of the pistons 116 and 118 is provided with a suitable packing 124, secured in place by a screw 126, see Fig. 5. The space defined by fingers 94, 100 and 102 forms a reservoir 101 for a fluid, such as oil, and communication between this space and the cylinders 112 and 114 is provided along two different paths.

Connected to each of the cylinders and extending downwardly therefrom, through flange 100, is a duct 130 which leads into one of two check valves 132 assembled in a block 134 that is secured to the flange 94 by welding, Fig. 1. Each of these check valves comprises a spring-pressed plunger 140 adapted to open away from a seat 142 formed in a closure plate 144 secured to the block by screws 146. These plungers 140 are hollow to receive a light spring 148 and are slotted at 150, see Fig. 1, to provide for free passage of fluid from the reservoir 101 to its associated cylinder 96 or 98 when the plunger moves to the right and away from its seat 142. These check valves close, however, to prevent flow of fluid from the cylinders back into the reservoir.

For permitting a restricted flow of fluid from the cylinders back to the reservoir, tapered metering pins 160 are provided. These metering pins are mounted in surrounding casings 162 and these casings extend through flange 100 into reservoir 101 and are mounted, by means of flanges 164 and screws 166, on the cross-member 106. Each pin 160 has a tapered portion 168 which is received in a correspondingly tapered bore 170 in its casing 162, upper and lower cylindrical bearing portions 172 and 174, rotatably mounted in bearing bores 176 and 178, respectively, in the casing 162, a reduced portion 180, and an upper end 182 that is threaded through the flange 164. Slots 182 are cut in the lower bearing portion 174 to permit flow of fluid therethrough. A locknut 184 and washer 186 are provided, and when these are loosened the pin can be rotated to raise or lower it and correspondingly increase or decrease the annular clearance between tapered portion 168 and bore 170. Thus the rate at which fluid will be discharged from either cylinder may be readily and accurately controlled. Communication between each of the cylinders 96 and 98 and its associated metering pin 160 is provided by a duct 188 which connects the cylinder to the annular space around the reduced portion 180 on the pin.

The hollow shaft 8 extends through the hub 90 and is shaped to form a gear segment 190 having teeth 192 that mesh with teeth 122 on the plunger 120 and also with abutment lugs 196 and 198 which are adapted, as will presently appear, to engage abutment faces 200 and 202 formed on the cylinder heads 96 and 98, respectively. As will be apparent, the rotary motion of hollow shaft 8 is transmitted to the shaft 4 through gear segment 190, plunger 120, and piston head 116 or 118, yieldingly and through the resistance of the flow of fluid around a metering pin 160, until one or the other of the abutment lugs 196 or 198 engages its cooperating abutment face 200 or 202 after which there will be a direct drive.

Figure 2:
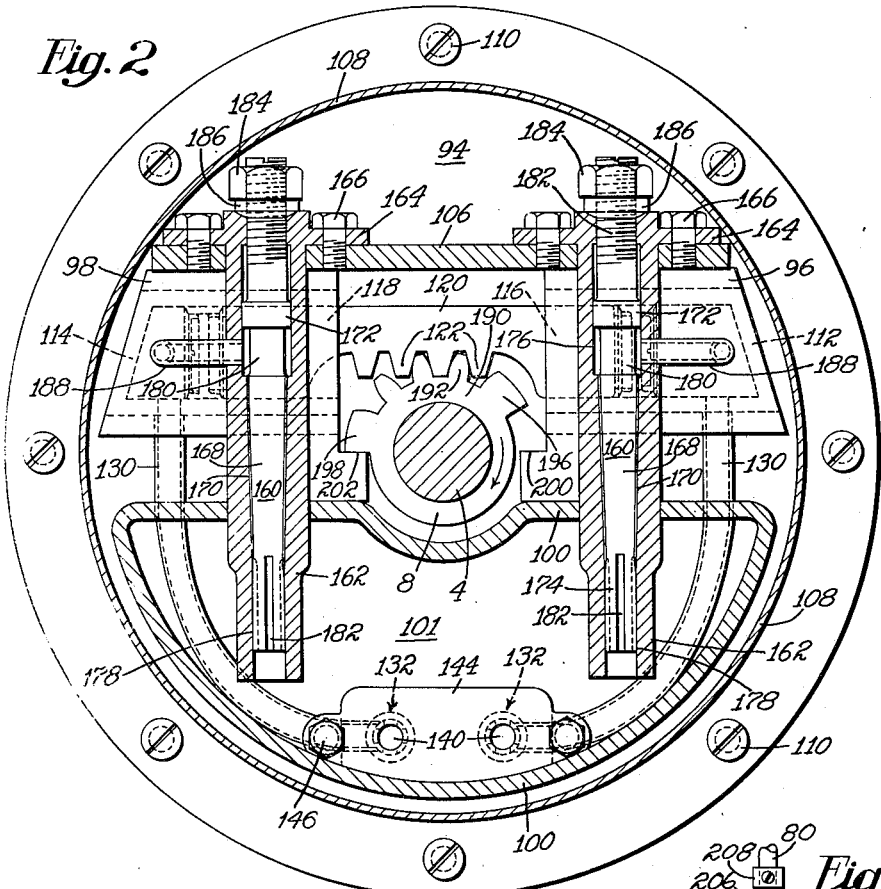
Fig. 2 is a view in section of a component part of the mechanism shown in Fig. 1, taken on line II—II of Fig. 1 and looking in the direction of the arrows.

Assuming, for the purpose of outlining a complete starting and stopping cycle, that the pulley is rotating in a clockwise direction as viewed from the left in Fig. 1, or counterclockwise in Fig. 3, see arrow, the operation of the drive mechanism is as follows. Until the treadle, not shown, is depressed to move rod 80 downwardly, the hollow shaft 8 is held stationary, by fingers 68 and 72, and the clutch member 34 is disengaged. Upon depression of the treadle, shaft 8 is released and pulley 2 coupled thereto in the manner explained above. Shaft 8 now starts to turn, with the pulley 2 in the direction of the arrow, and tends to rotate the cylinder heads 96 and 98 and hub 104 connected thereto in the same direction. Due to the inertia of the parts driven by shaft 4, which is keyed to the hub 104, a great resistance to movement is engendered and a severe shock would result if a direct drive were immediately established. However, this is avoided, and the shock is absorbed by the dashpot or cushioning action of plunger 120 which now is moved, to the right, Fig. 2, by segment 190, thus causing the piston 116 to force fluid out of cylinder 112, through the restricted passage, around metering pin 160, while shaft 8 rotates relatively to shaft 4 and hub 104. By properly proportioning the metering effect, as by suitable adjustment of the pin 160 in the manner described above, it is possible to absorb substantially all the inertia and to bring the speed of shaft 4 up to that of shaft 8 just as lug 196 comes into engagement with abutment surface 200 and a positive drive is effected.

When the treadle is released a reverse action takes place. Now pulley 2 is disconnected from shaft 8 and the latter immediately locked against rotation by fingers 68 and 72. Shaft 4 and hub 104, however, due to the momentum of the parts driven by shaft 4, tend to continue to rotate and a correspondingly severe shock would result if it were directly connected to shaft 8. This is avoided, since the cylinder heads 96 and 98 and hub 104 can continue to rotate, and in so doing, will cause the piston head 118 to force fluid from its cylinder and through the space around its metering pin. The resulting dashpot effect will absorb the built-up momentum just as the parts reach the positions shown in Fig. 2, in which further movement of the parts in this direction is positively limited by engagement of lug 198 with abutment face 202. It will, of course, be understood that during movement of plunger 120 in either direction, fluid will be drawn into one or the other of the cylinders 112 or 114 by a retreating piston 116 or 118 through its associated check valve 132.

Figure 7:
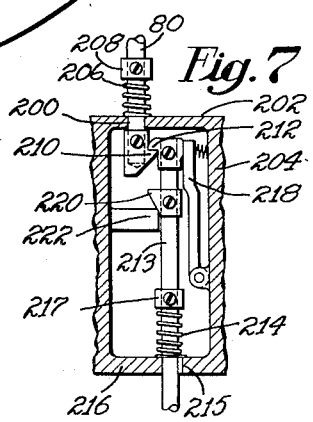
Fig. 7 is a view in section of a portion of a controlling mechanism.

With the mechanism so far described, the shaft 4 will be continuously driven so long as the treadle is held down. However, the drive mechanism may be readily adapted to provide a single revolution clutch action, if desired, and in Fig. 7 an operating mechanism of this type is illustrated. The rod 80, which is shown extending through a bore 200 in the wall 202 of a hollow boss 204 associated with the frame of the machine, is urged upwardly by a compression spring 206 interposed between the wall 202 and a collar 208 on the rod. Secured to the end of this rod is a hook member 210 adapted to be engaged by a second hook member 212 carried by a second rod 213 which extends upwardly into the hollow boss 204 through a clearance hole 215. This rod is normally held in the position shown by a compression spring 214, interposed between a wall 216 of the boss and a collar 217, and spring pressed arm 218. Secured to the rod 213 is a cam plate 220 adapted, when the rod 213 is moved downwardly, as by a treadle not shown, to ride over a projection 222, formed integrally with the boss 204, and to cam the rod 213 to the right, against the resistance of the spring-pressed arm 218, until the hook member 212 is disengaged from the hook member 210. When this occurs, rod 80 is released and will be returned to the position shown by spring 206. The arrangement is such that the disengagement of the hook members occurs just as fingers 68 and 72 move out of engagement with the abutment faces 16 and 18 and shaft 8 is connected with pulley 2 by the clutch member 34. The continued downward movement of the rod 213, by the treadle, will effect immediate release of rod 80 so that the parts will return to the positions shown in full lines in Fig. 3, after a single revolution of shaft 8. Before the shaft 8 can again be coupled to pulley 2, the treadle must be released to permit rod 213 to rise and hook member 212 to reengage the hook member 210.

Having described our invention, what we claim as new and desire to secure by Letters Patent of the United States is:

1. A drive mechanism having, in combination, a driving member, a driven shaft, an intermediate member, means operable selectively to connect the intermediate member positively to the driving member or to disconnect said driving member and positively stop said intermediate member, and yieldable means connecting the driven shaft to said intermediate member, said last-named means comprising fluid cushioning devices and positive drive connections constructed and arranged to cushion the inertia shock of said driven shaft and then to effect a positive drive, when the driving member is connected to the intermediate member, and to absorb the momentum of said driven shaft and then effect a positive stop, when said driving member is disconnected and said intermediate member stopped.

2. A drive mechanism having, in combination, a driving member, a driven shaft, an intermediate shaft mounted on and rotatable relatively to said driven shaft, clutch and stop means operable selectively to connect the driving member positively to said intermediate shaft or to disconnect said driving member and positively hold said intermediate shaft against rotation in either direction, and yieldable drive means connecting the driven shaft to said intermediate shaft, said last-named means comprising fluid cushioning devices and positive drive connections constructed and arranged to cushion the inertia shock of said driven shaft and then to effect a positive drive, when the driving member is connected to the intermediate shaft, and to absorb the momentum of said driven shaft and then to effect a positive stop, when said driving member is disconnected and said intermediate shaft held against rotation.

3. A drive mechanism having, in combination, a driving member, a driven shaft, an intermediate member, means operable selectively to connect the intermediate member positively to the driving member or to disconnect said driving member and positively stop said intermediate member, and yieldable means for connecting the driven shaft to said intermediate member, said last-named means comprising a pair of independently adjustable fluid cushioning devices and positive drive connections constructed and arranged to cushion the inertia shock of said driven shaft and then to effect a positive drive when the driving member is connected to the intermediate member, and to absorb the momentum of said driven shaft and then effect a positive stop, when said driving member is disconnected and said intermediate member stopped.

4. A driving mechanism having, in combination, a driving member, a driven shaft, an intermediate shaft mounted on and rotatable relatively to said driven shaft, clutch and stop means operable selectively to connect the driving member positively to said intermediate shaft or to disconnect said driving member and positively hold said intermediate shaft against rotation in either direction, and yieldable drive means connecting the driven shaft to said intermediate shaft, said last-named means comprising a pair of independently adjustable fluid cushioning devices and positive drive connections constructed and arranged to cushion the inertia of said driven shaft and then to effect a positive drive, when the driving member is connected to the intermediate shaft, and to absorb the momentum of said driven shaft and then effect a positive stop, when said driving member is disconnected and said intermediate shaft held against rotation.

5. A drive mechanism having, in combination, a driven shaft, a hollow shaft mounted on the driven shaft and yieldably connected thereto, a driving wheel rotatably mounted on the hollow shaft, abutment faces formed on the hollow shaft, stop fingers movable into engagement with said faces to hold the hollow shaft against rotation in either direction and away from said faces to free the hollow shaft for rotation, a clutch member for selectively connecting or disconnecting the driving wheel to the hollow shaft, means for selectively moving said stop fingers away from said abutment faces and simultaneously engaging the clutch member or disengaging the clutch member and simultaneously moving the stop fingers into engagement with said abutment faces.

6. A drive mechanism having, in combination, a driven shaft, a hollow shaft mounted on the driven shaft and yieldably connected thereto, a driving wheel rotatably mounted on the hollow shaft and provided with a recess for engagement with a clutch member, abutment faces formed on the hollow shaft, stop fingers movable into engagement with said abutment faces to hold the hollow shaft against rotation in either direction and away from said abutment faces to free the hollow shaft for rotation, a clutch member carried by said hollow shaft and movable selectively into engagement with said recess to connect said driving wheel to the hollow shaft or out of said recess to disconnect said driving wheel from said hollow shaft, and means for selectively moving said stop fingers away from said abutment faces and simultaneously causing said clutch member to move into said recess or withdrawing said clutch member from said recess and simultaneously moving said stop fingers into engagement with said abutment faces.

7. A drive mechanism having, in combination, a driven shaft, a hollow shaft mounted on the driven shaft, a driving wheel rotatably mounted on the hollow shaft, means for connecting the driving wheel to the hollow shaft, and means for yieldably connecting the hollow shaft to the driven shaft, said last-named means comprising a pair of fluid dashpots operatively connected to the driven shaft, a double-acting plunger associated with said dashpots, gearing for connecting the plunger to the hollow shaft, and means for independently varying the effect of each of said fluid dashpots.

8. A drive mechanism having, in combination, a driven shaft, a hollow shaft mounted on the driven shaft, a casing rotatably mounted on the hollow shaft and positively connected to the driven shaft, a pair of fluid dashpots carried by the casing, a double-acting plunger associated with said dashpots, rack teeth formed on the plunger, and a gear quadrant formed on the hollow shaft and meshing with said rack teeth.

9. A drive mechanism having, in combination, a driven shaft, a hollow shaft mounted on the driven shaft, a casing rotatably mounted on the hollow shaft and positively connected to the driven shaft, a pair of cylinders mounted on the casing, a fluid reservoir formed in the casing, means for connecting each of said cylinders to said fluid reservoir including a restricted return passage and an unrestricted supply passage, a double-acting plunger associated with said cylinders, gearing for connecting the plunger to the hollow shaft, and means associated with each return passage for varying the effective area thereof.

10. A drive mechanism having, in combination, a driven shaft, a hollow shaft mounted on the driven shaft, a casing rotatably mounted on the hollow shaft and positively connected to the driven shaft, a pair of fluid dashpots carried by the casing, a double-acting plunger associated with said dashpots, gearing connecting the plunger to the hollow shaft, and means for limiting rotary movement of said hollow shaft in either direction relative to the casing.

PAUL H. DIXON.
DANIEL WALKER HANNABLE.

REFERENCES CITED

The following references are of record in the file of this patent:

UNITED STATES PATENTS

| Number | Name | Date |
|---|---|---|
| 517,439 | Cross | Apr. 3, 1894 |
| 655,973 | Hakewessell | Aug. 14, 1900 |
| 811,981 | Wildman | Feb. 6, 1906 |
| 1,054,468 | Steadman | Feb. 25, 1913 |
| 1,155,124 | Berger | Sept. 28, 1915 |
| 1,248,811 | Corrall | Dec. 4, 1917 |
| 1,459,851 | Morse | June 26, 1923 |
| 1,498,353 | Coatalen et al. | June 17, 1924 |
| 1,659,311 | Candee | Feb. 14, 1928 |
| 1,880,666 | Barnes et al. | Oct. 4, 1932 |
| 2,316,820 | Thelander | Apr. 20, 1943 |